United States Patent [19]

Sokol

[11] Patent Number: 4,551,801

[45] Date of Patent: Nov. 5, 1985

[54] MODULAR VEHICULAR MONITORING SYSTEM

[75] Inventor: David G. Sokol, Auburn, Ill.

[73] Assignee: Dickey-john Corporation, Auburn, Ill.

[21] Appl. No.: 464,220

[22] Filed: Feb. 7, 1983

[51] Int. Cl.⁴ ...................... G06F 15/20; A01D 41/00

[52] U.S. Cl. .................................. 364/424; 364/551; 364/580; 340/52 F; 340/684; 56/10.2

[58] Field of Search .................. 364/424, 431.04, 551, 364/580; 340/52 R, 52 F, 517, 684, 521; 56/10.2, DIG. 15

[56] References Cited

U.S. PATENT DOCUMENTS

| | | | |
|---|---|---|---|
| 4,267,569 | 5/1981 | Baumann et al. | 364/424 |
| 4,271,402 | 6/1981 | Kastura et al. | 340/52 F |
| 4,296,409 | 10/1981 | Whitaker et al. | 364/551 |
| 4,372,274 | 2/1983 | Takase | 364/431.04 |
| 4,376,298 | 3/1983 | Sokol et al. | 364/551 |
| 4,401,949 | 8/1983 | Gold | 364/551 |

*Primary Examiner*—Gary Chin

*Attorney, Agent, or Firm*—Trexler, Bushnell & Wolters, Ltd.

[57] ABSTRACT

A monitoring module is provided for monitoring a plurality of functions and conditions of a vehicle including a plurality of sensors for producing sensor signals in response to a plurality of vehicle functions and conditions. The monitoring module comprises a plurality of inputs each for receiving one of the sensor signals, the inputs being fewer in number than the vehicle functions and conditions to be monitored. The monitoring module also includes a processor responsive to the sensor signals from the inputs for producing display signals corresponding to the values of the respective functions and conditions. The monitoring module further includes a memory for storing data and instructions for enabling the processor to respond to any of the sensors for monitoring any of the vehicle functions and conditions. The monitoring module further includes a sensor identifying arrangement for producing signals to identify the particular sensors coupled to the inputs. The processor is responsive to these sensor identifying signals for selecting from the memory data and instructions for response to the particular sensors coupled to the inputs. Hence, one or more substantially identical monitoring modules may be utilized to monitor all of the vehicle functions and conditions for which corresponding sensors have been provided on a particular vehicle.

24 Claims, 7 Drawing Figures

30
122
LCD DRIVER
BP
CE
D
CLK
LCD DRIVER
BP
D
DR
DS1
DS2
CS
120
31
+V
+IGN.
BATT.
+V'
124
VR
VCC
P2.6
P2.7
P1.7
P2.0
P2.1
P2.2
I
100
µP
DB0
DB7
W
R
ALE
P1.0
P1.1
P1.2
P1.3
P1.4
P1.5
P1.6
P2.3
P2.4
P2.5
126
128
A TO D
102
NVM
E2PROM
104
130
132
BATT.
MUX 16:1
116
108
SWITCH INPUT CIRCUIT
110
110a
110n
ANALOG INPUT CIRCUIT
112
112a
112b
FREQ. INPUT CIRCUIT
114
112c
FREQUENCY INPUT CIRCUIT
114a

MODULAR VEHICULAR MONITORING SYSTEM

BACKGROUND OF THE INVENTION

The present invention is directed generally to the monitoring arts and more particularly to a novel modular monitoring system for monitoring a plurality of functions and conditions of a vehicle.

While the invention is not so limited, the description will be facilitated by particular reference to the monitoring of a plurality of functions and conditions of an agricultural vehicle such as a tractor. Electro-mechanical and electronic monitoring arrangements for such tractors are generally known in the art. One such electronic monitoring system is shown and described for example in the co-pending application of Robert C. Funk, Ser. No. 284,571, now U.S. Pat. No. 4,419,654, entitled Tractor Data Center.

Generally speaking the foregoing prior art monitoring systems have comprised "dedicated" monitors. A dedicated monitor is generally one in which the functions and conditions of the tractor or other vehicle to be monitored, as well as the particular sensors provided on the vehicle are identified in advance. Hence, the monitor is specifically designed for and hence "dedicated" to the monitoring of those particular vehicle functions and conditions in response to signals from the particular, pre-identified associated sensors. Accordingly, such "dedicated" monitoring systems generally cannot be readily modified in the field to accommodate different vehicles, different sensors and/or different conditions and functions. Rather, such systems are generally limited to use with a particular vehicle type or model for which the monitoring system has been designed or "dedicated".

However, a manufacturer of monitoring equipment need not provide a totally new monitoring system for each vehicle or each variation in vehicle sensors or functions to be monitored. The prior art, as disclosed for example in the above-referenced co-pending application, has provided means by which a standardized monitoring system may be modified within certain limits to "dedicate" the system to any of a plurality of different vehicles comprising differing sensors for monitoring differing functions and conditions.

However, such prior art monitors have generally been relatively expensive to "dedicate" in this fashion, often requiring extensive modification to input interface circuitry required to receive the particular sensor signals selected and pass these signals on to appropriate processing circuits. Moreover, relatively time consuming and expensive reprogramming is also generally required for each particular "dedication" of the prior art monitoring systems. Additionally, relatively expensive modifications of display facilities of such monitors are also often required to accommodate varying "dedications" of the monitoring system.

Further in this regard, provision of a monitoring system capable of modification for association with different vehicles having different sensors and corresponding functions and conditions to be monitored was heretofore relatively expensive. As mentioned above, an attempt was made in such monitoring systems to provide sufficient inputs, programming and processing capabilities and associated interface circuits for accommodating a relatively broad variety of different functions and conditions and associated sensors for these functions and conditions. Hence, the purchaser of such a dedicated system might often be required to pay for a number of circuits and features which were not useful in conjunction with monitoring needs of a more modest or limited extent.

OBJECTS AND SUMMARY OF THE INVENTION

Accordingly, it is a general object of this invention to provide a novel and improved modular monitoring system which substantially avoids the problems of "dedicated" systems of the prior art.

A more specific object is to provide such a modular monitoring system which utilizes one or more standardized, structurally identical monitoring modules, each of which may be relatively simply and inexpensively customized to monitor different combinations of vehicle functions and conditions in response to associated sensors of different types and kinds, with but a minimum of effort and expense.

A related object is to provide such a modular monitoring system which is relatively simple and inexpensive when compared to prior art dedicated monitoring systems, and yet highly reliable in operation.

Briefly, and in accordance with the foregoing objects, the invention provides a monitoring system for monitoring a plurality of functions and conditions of a vehicle, said vehicle including a plurality of sensors for producing sensor signals in response to at least selected ones of said plurality of vehicle functions and conditions. The monitoring system comprises at least one monitoring module comprising a plurality of input means each for receiving one of said sensor signals, said plurality of input means being fewer in number than said plurality of vehicle functions and conditions. The monitoring module includes processing means responsive to the sensor signals from the input means for producing display signals corresponding to the values of the associated functions and conditions. The monitoring module further includes memory means for storing data and instructions for enabling the processing means to respond to any of the sensor means for monitoring any of said plurality of vehicle functions and conditions. The monitoring system further includes sensor identifying means for producing sensor identifying input signals to identify the particular sensors coupled to the input means. The processing means is responsive to the sensor identifying input signals for selecting from the memory means data and instructions for response to the particular sensors coupled to the input means. Hence, one or more substantially identical monitoring modules may be utilized to monitor all of the plurality of vehicle functions and conditions for which corresponding sensor means have been provided on a particular vehicle.

BRIEF DESCRIPTION OF THE DRAWINGS

The foregoing, as well as other objects, features and advantages of the invention will be more readily appreciated upon reference to the following detailed description of the illustrated embodiment, together with reference to the accompanying drawings, wherein.

DETAILED DESCRIPTION OF THE ILLUSTRATED EMBODIMENT

Figure 1:
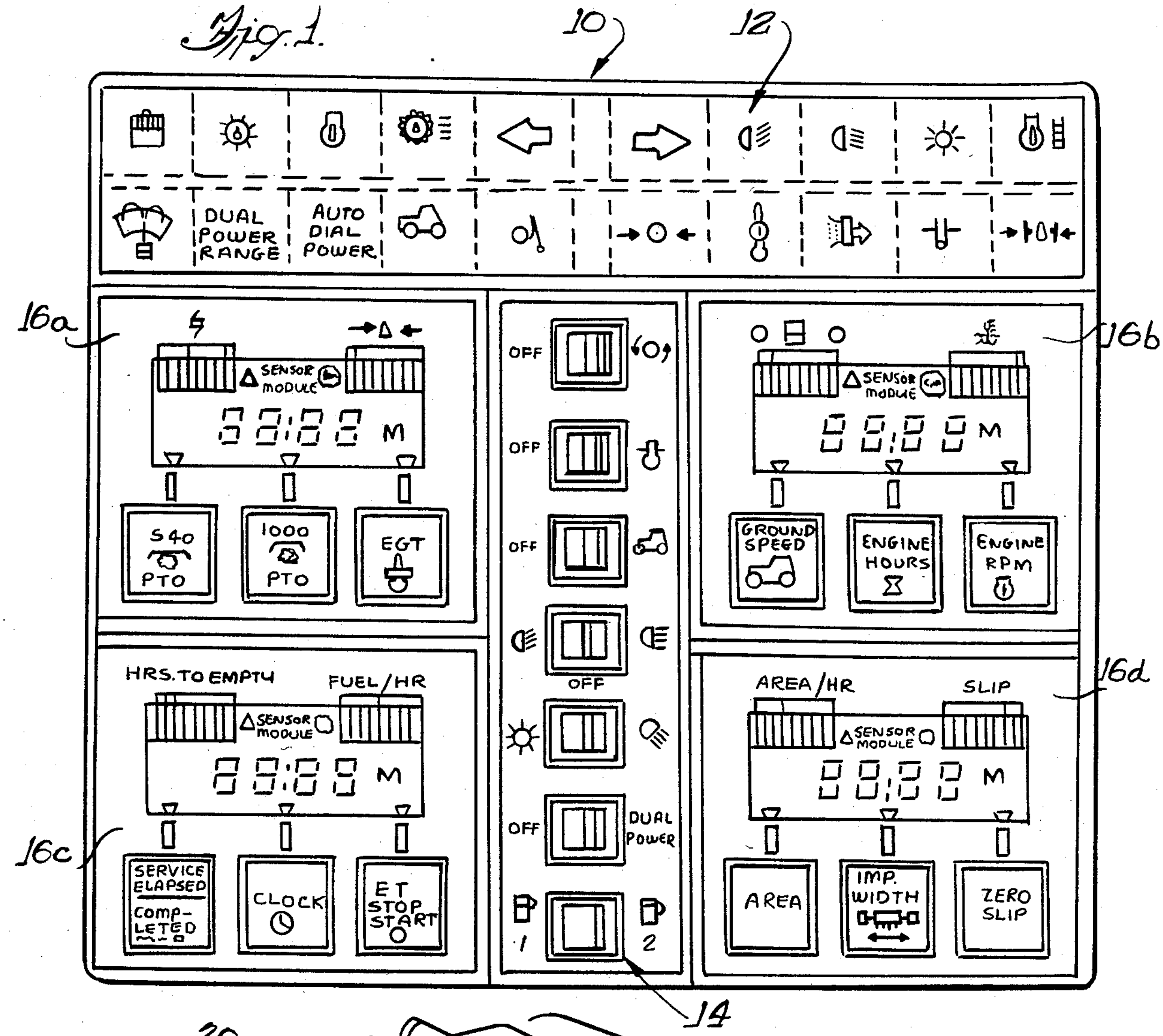
FIG. 1 is a front plan view of an exemplary vehicle control panel which has been provided with a novel modular monitoring system in accordance with the invention.

Referring now to the drawings and initially to FIG. 1, an exemplary vehicle control panel is designated generally by the reference numeral 10. While the invention is not so limited the description will be facilitated by specific reference to the monitoring of functions and conditions of an agricultural machine such as a tractor. In accordance with conventional practice, the control panel may include a plurality of indicator lamps or similar devices designated generally by the reference numeral 12 for indicating operation of a plurality of vehicle functions such as headlights, windshield wipers or the like. Also in accordance with conventional practice a plurality of control switches designated generally 14 may be provided for controlling a plurality of vehicle functions such as headlights, windshield wipers or the like.

Departing from convention and in accordance with the invention, one or more novel monitoring modules 16 may also be provided. In the illustrated embodiment four substantially identical monitoring modules are designated by reference numeral 16, together with suffixes *a, b, c* and *d.* As will be seen later, although they are structurally the same, each of these monitoring modules is capable of being "customized" for monitoring a plural number of vehicle functions and conditions selected from the total number of vehicle functions and conditions which may be monitored. Hence, collectively, these monitoring modules 16 are capable of monitoring a broad variety of different vehicle functions and conditions.

Accordingly, one may choose to utilize only a single customized monitoring module to monitor a limited number of functions or conditions. Alternatively, a plurality of customized modules may be utilized as illustrated in FIG. 1 to add to the number and variety of conditions and functions monitored.

Figure 2:
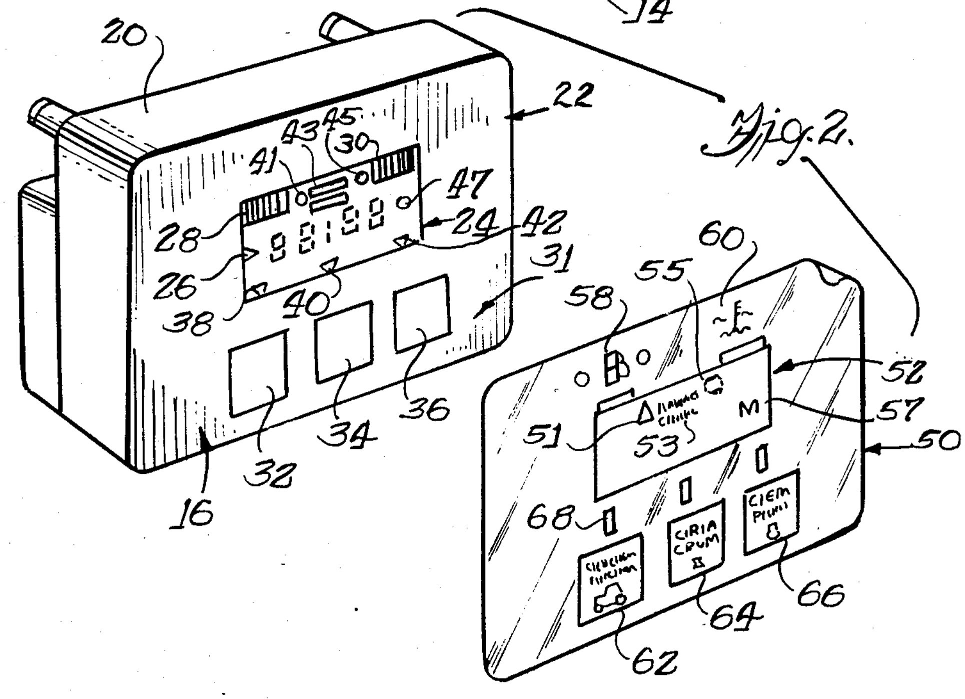
FIG. 2 is an exploded perspective view illustrating a modular display panel, together with novel labeling indicia in accordance with one aspect of the invention.

Referring now to FIG. 2, each module 16 comprises a suitable housing or casing 20 which has a front panel 22. In the illustrated embodiment, panel 22 includes a visual display 24. Display 24 comprises four 7-segment alphanumeric display characters 26 and a pair of segmented bar graph display elements 28 and 30. Additionally, the display 24 includes a plurality of selectively energizable, discrete visual segments, 41, 43, 45 and 47. The additional segments 41 and 45 may be utilized as warning indicators in conjunction with functions or conditions for which an indication is only desired if the function or condition goes out of a predetermined range. These segments 41 and 45 may also be used to indicate malfunctions such as an open circuit or short circuit condition at sensor inputs to the module. The indicators 43 may also be used to indicate sensor malfunctions either alone or together with a numeral 26 to identify the malfunctioning sensor, and to indicate malfunctioning of the module 16 itself. The indicator 47 is preferably used as an English/metric indicator in conjunction with the values of monitored functions displayed by the alphanumeric characters 26.

Below the display 24 is located a control panel 31 including three selection elements 32, 34 and 36. In the illustrated embodiment, these selection elements preferably comprise pressure sensitive switches. Cooperatively, the display 24 also preferably includes three visual indicators 38, 40 and 42 located above the respective selection switches 32, 34 and 36 to indicate which of these switches is in an activated condition.

In accordance with a feature of the invention, it will be noted that the foregoing display and selection elements of the front panel 22 are not provided with labels or indicia to indicate the functions or conditions associated therewith. Advantageously, as previously mentioned, each monitoring module 16 is capable of being "customized" to accommodate selection and display of a given plural number of vehicle functions and conditions selected from among the total number of vehicle functions and conditions which may be monitored. Accordingly, upon selection of a particular group of functions and conditions to be monitored by a given module 16, a suitable label or decal 50 may be applied to the front panel 22 thereof. This label or decal 50 bears suitable indicia to indicate the particular functions and conditions which have been selected for monitoring by the module 16.

Cooperatively, the label or decal 50 includes a transparent rectangular window 52 through which the display 24 may be viewed unimpeded. This window 52 includes additional suitable labels or indicia 51, 53, 55 and 57 to be placed over or in association with each of the indicators 41, 43, 45 and 47.

Additionally, the label or decal 50 includes indicia 58 and 60 positioned for association with the segmented bar graphs 28 and 30 to indicate the functions or conditions whose relative values are being displayed by these bar graphs. With respect to the alphanumeric display characters 26, it is preferred that the functions and conditions displayed thereby be selected by the respective pushbutton selector members 32, 34 and 36. Preferably, each selector 32, 34, 36 is capable of selecting one of at least two functions for display. Accordingly, the label or decal 50 bears suitable indicia or labels 62, 64 and 66 positioned to overlie the respective pushbuttons or selectors to indicate the functions to be displayed by the alphanumeric characters 26 as each pushbutton is activated. In the illustrated embodiment, relatively short segments designated generally 68 are also provided intermediate the display indicators 38, 40 and 42 and respective associated pushbutton selectors 32, 34 and 36.

Referring again briefly to FIG. 1, specific examples of indicia for labels associated with the four monitor modules 16 are illustrated.

Referring next to FIGS. 3 through 6, alternative methods and apparatus are shown for customizing each monitoring module 16 for the monitoring and display of a given number of selected functions and conditions of the vehicle. Accordingly, and referring initially to FIG. 3, a typical module 16 as illustrated in FIG. 2 is shown from a rear perspective. The label or decal 50 is also illustrated in a rear perspective view in FIG. 3. In accordance with one embodiment of the invention, a card edge connector member 70 protrudes from a rear, side portion of the housing 20. Such card edge connectors are known in the art and hence the connector 70 need not be described herein. However it will be appreciated that other suitable electrical connectors may be utilized in place of the card edge connector 70 here illustrated without departing from the invention. This card edge connector 70 receives inputs from those sensors associated with a vehicle which are selected for monitoring by this particular monitoring module 16. To this end, a suitable mating connector 72 is provided for receiving conductors or a cable designated generally 74 from the respective sensors selected for association with the module 16.

In accordance with a feature of the invention, the card connector 70 and mating connector 72 also include respective mating connector portions 70*a* and 72*a*. Connector portions 70*a* and 72*a* are arranged to carry an encoded signal for indicating to the module 16 the identities of the particular sensors selected for association therewith. To this end, the conductors 74 preferably include one conductor which carries a suitable positive DC voltage and a ground conductor. The code portion 72*a* includes a plurality of connector members or pins for carrying a suitable code corresponding to the identities of the sensors coupled to the connector 72 by the cable 74. In this regard, each of these code pins or connectors in the portion 72*a* is coupled by a suitable jumper wire 76 to one of the positive DC voltage and ground conductors carried in the cable 74 to form a binary, digitally encoded signal.

In the illustrated embodiment, a three-bit binary encoded signal is provided, thereby accommodating at least eight different predetermined combinations of sensor inputs. It will be recognized, however, that a larger or smaller number of code bits may be provided in similar fashion to that described without departing from the invention. In this regard, it will be recognized that the number of binary bits provided in the encoded signal will depend upon the desired number of possible combinations of sensors. This in turn reflects the possible number of combinations of vehicle functions and conditions which may be monitored by a given module 16, out of the total number of functions and conditions of the vehicle which may be monitored.

Figure 3:
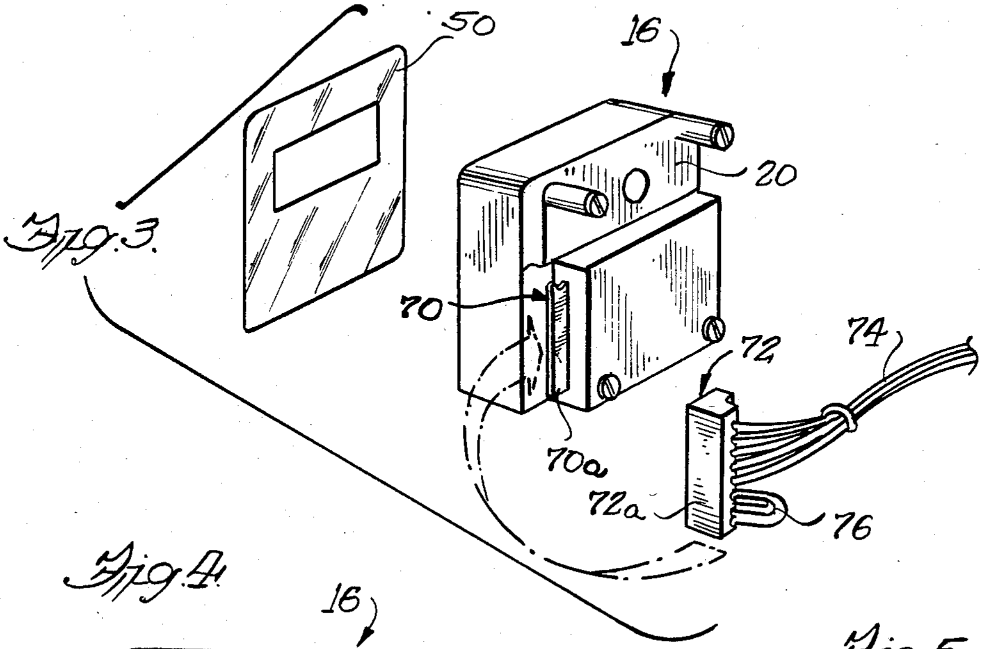
FIG. 3 is a rear view of a monitoring module in accordance with the invention illustrating one method of customizing the module to a particular application.
Figure 4:
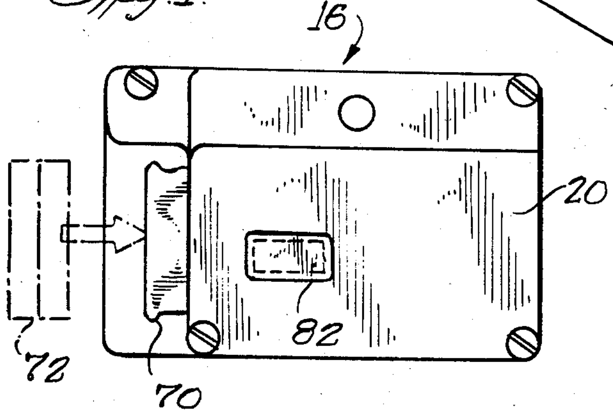
FIG. 4 is a rear perspective view similar to FIG. 3 illustrating yet another method of customizing the monitoring module in accordance with the invention.
Figure 5:
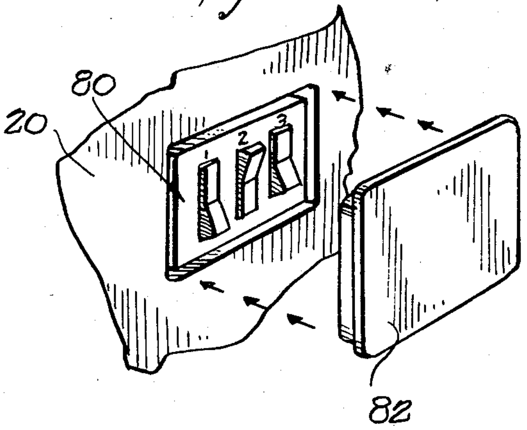
FIG. 5 is an enlarged perspective view of a portion of FIG. 4.

Referring now to FIG. 4 and FIG. 5 an alternate method and associated structure is shown for providing the above-mentioned encoded signal representing the identities of the particular sensors to be coupled to the module 16. In similar fashion to the embodiment described with reference to FIG. 3 a suitable multiple bit binary encoded signal is provided in the embodiment of FIGS. 4 and 5 by the provision of three, two-position switches designated generally by the reference numeral 80. Hence, the card edge connector 70 of FIG. 4 is used only to receive sensor inputs from mating connector 72. In the embodiment illustrated in FIGS. 4 and 5, the switches 80 are mounted to a rear surface of the module housing or casing 20. In accordance with a preferred form of this embodiment, a suitable removable cover plate 82 is also provided for normally covering these three, two-position switches 80. It will be recognized from the foregoing that the three, two-position switches 80 may readily be coupled to suitable sources of positive DC voltage and ground to produce a logic 1 or logic 0 binary code. As with the embodiment of FIG. 3, it will be recognized that more or fewer such switches 80 may be provided, as required to provide a multiple bit binary encoded signal representative of a desired number of combinations of sensors which may be coupled with the monitoring module 16.

Figure 6:
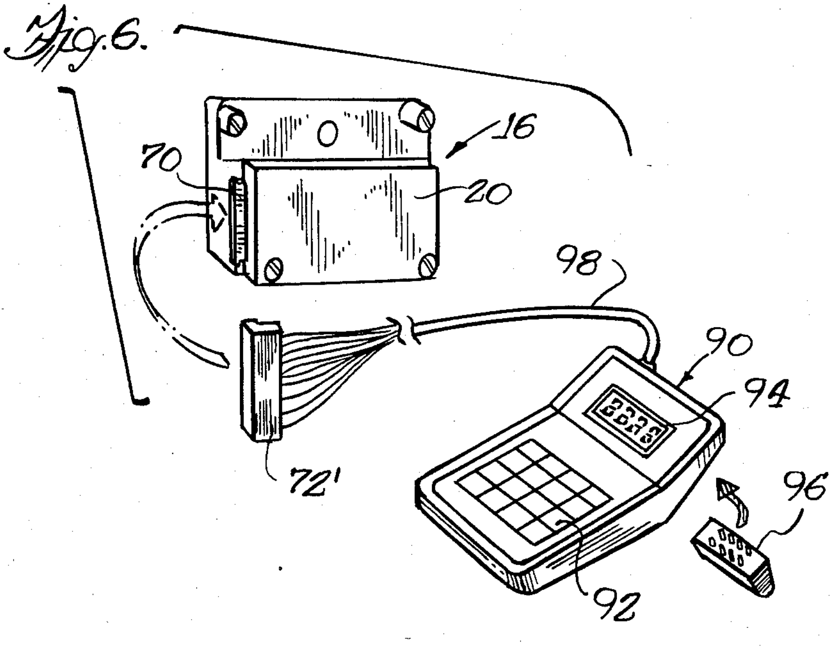
FIG. 6 is a rear perspective view similar to FIG. 4 and illustrating apparatus for use in yet another method of customizing the monitoring module in accordance with the invention.

Reference is next invited to FIG. 6 wherein an alternate method and structure is shown for customizing a module 16 for association with particular sensors corresponding to particular vehicle functions and conditions.

In the embodiment of FIG. 6, a similar card edge connector 70 is also provided protruding from a rear side portion of the housing 20. However, a similar mating connector 72' is coupled not to the selected vehicle sensors as in the embodiment of FIG. 3 but to a programmer/tester device designated generally by the reference numeral 90. This programmer/tester 90 resembles a calculator and includes a plurality of numeric and/or function keys on a keyboard designated generally 92, and a suitable display panel or window 94 containing a plurality of 7-segment alphanumeric display characters. Suitable application programs storage for the programmer/tester module 90 may be provided by a suitable interchangeable memory module designated generally 96 which may be removably coupled with a suitable mating connector (not shown) on an exterior portion of the programmer/tester device 90.

In accordance with the invention, the programmer/tester 90 may be utilized either as an alternative to the structures for customizing the module 16 illustrated in FIGS. 3, 4 and 5 above or in addition thereto. In the former regard, it will be recognized that the programmer/tester may readily be utilized to provide suitable encoded signals to code pins or portions of the connector 70 for indicating the identities of particular sensors to be accommodated by the module 16. In the latter regard, the programmer/tester may alternatively be utilized to alter or modify the programming of the module 16.

In this latter connection, as will be more fully described later, each module 16 is provided with suitable data and instructions carried in an internal memory structure for cooperating with any of a broad variety of sensors which may be associated with a vehicle for monitoring vehicle functions and conditions. Accordingly, upon receiving sensor identifying information by way of encoding pins 72*a*, the encoding switches 80, or the programmer/tester 90, the module 16 responds by selecting from the memory only those data and instructions necessary for cooperating with those particular sensors. Provision of a suitable decal, as described above, is preferably coordinated with this customizing procedure.

However, in accordance with the embodiment of FIG. 6, the card edge connector 70 may additionally be utilized for additional programming or test functions. In this regard, it may be desirable to alter the data and instructions contained in the memory of the module 16 to accommodate yet further sensors or different types of sensors from those accommodated by the initial programming or data carried in the memory. This may readily be accomplished by suitable connections between an output line or cable 98 of the programmer/tester 90 and the card edge connector 70 by means of the mating connector 72'. Moreover, provision of the programmer/tester and interchangeable application program memory unit 96 also permits testing of a module 16 for proper functioning thereof. In this regard, the programmer/tester may act as a simulator to simulate the input signals from a plurality of sensors associated with given vehicle functions and conditions having known, predetermined values. Hence, the operation of the module 16 may be tested by observing the display produced thereby in response to these known inputs from the programmer/tester 90.

Figure 7:
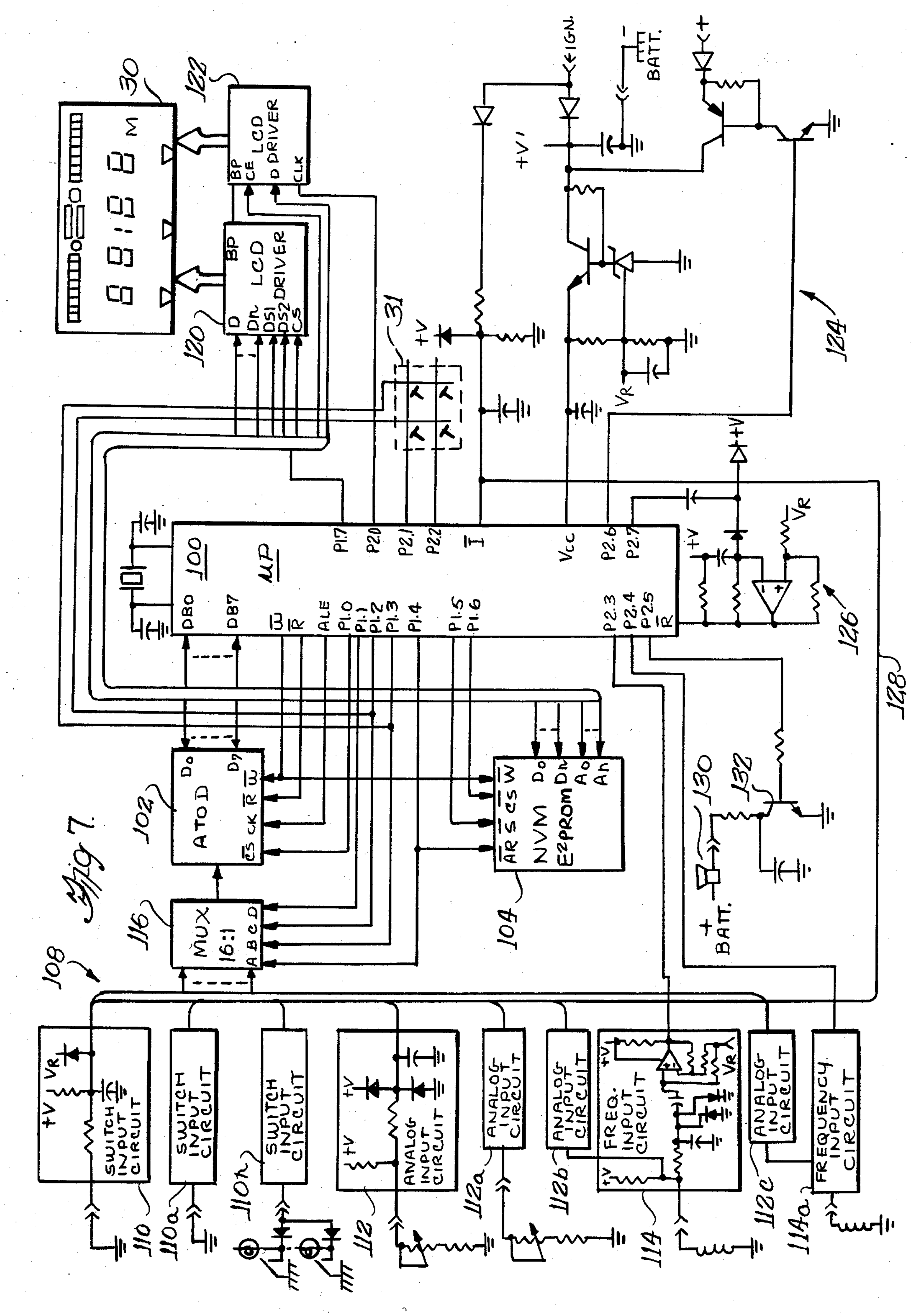
FIG. 7 is a schematic circuit diagram illustrating a preferred circuit of a monitoring module in accordance with this invention.

Reference is now invited to FIG. 7, wherein details of the internal circuitry of a monitoring module 16 are illustrated in circuit schematic form. As previously mentioned, all modules 16 are identically constructed. Hence, the circuit of FIG. 6 will be understood to be identically reproduced in each module 16*a*, 16*b*, 16*c*, 16*d* in the example of FIG. 1. The functioning of the module in conjunction with the programming, sensor identification and sensor input devices and embodiments illustrated and described above with reference to FIGS. 3 through 6 will be described with reference to FIG. 7.

The monitoring module 16 comprises a monitoring circuit including a microcomputer or microprocessor component 100. In the illustrated embodiment, this microcomputer 100 is of the type generally designated 8050 manufactured by Intel or National Semiconductor. The microcomputer 100 has a two eight-bit input/output (I/O) ports here designated by port numbers and bit numbers, for example, P1.0, P1.1, etc. An eight-bit bidirectional data bus is designated by reference numerals DB0 through DB7. Coupled with this eight-bit data bus is an analog to digital (A to D) circuit component 102 which in the illustrated embodiment comprises National Semiconductor part number ADC 0804 CCN. Also coupled with the eight-bit data bus is the memory portion of the modular monitoring unit mentioned above.

In the illustrated embodiment this memory comprises an integrated circuit non-volatile memory (NVM) which includes an electrically alterable read only memory ($E^2PROM$). In the illustrated embodiment a memory component generally designated IXD2210 manufactured by Xicor is utilized. Suitable control inputs of the memory 104 and of the A to D convertor 102 are coupled with suitable control outputs of the microcomputer 100 as illustrated.

The selected plurality of sensors associated with conditions and functions of the vehicle to be monitored by this particular monitoring module 16 are fed to suitable input ciruits provided therefor and designated generally by the reference numeral 108. In the illustrated embodiment, these input circuits 108 comprise three basic types of input circuits, one of each type having been illustrated in circuit schematic form and the remaining similar input circuits in block form. It will be understood that the circuits illustrated in block form are the same as the similarly designated circuits illustrated in schematic form.

In this regard, one type of input circuits comprises switch input circuits 110. A second type of input circuits comprise analog input circuits 112, and a third type or group of input circuits comprise frequency input circuits 114. Generally speaking, the switch input circuits 110 are configured for receiving inputs from sensors which detect functions or conditions which have only two possible states such as on/off, active/inactive or the like. The analog input circuits 112 are configured for receiving inputs from sensors which produce an analog output signal which generally varies linearly or in a predetermined proportion to the value of the function or condition monitored thereby. The frequency input circuits 114 are configured for receiving signals from sensors which produce a periodic signal which varies in frequency in accordance with the function or condition being monitored in a known, preselected fashion.

In this regard, it will be noted that a plurality of switch input circuits 110*a*–110*n* are provided. These input circuits include at least three similar switch input circuits for receiving the three-bit sensor identifying encoded input described above with reference to the embodiments of FIG. 3 and of FIGS. 4 and 5 respectively. It will be appreciated that the programmer/tester 90 of FIG. 5 may also be accommodated by the illustrated switch input circuits 110*a*–110*n* which may comprise as many additional switch input circuits as necessary to accommodate the number of output lines desired for the programming function thereof. On the other hand, when the testing function is selected the programmer/tester 90 will feed suitable ones of the illustrated input circuits 110, 112, 116 to simulate the coupling of a particular group of sensors therewith.

All of the switch input circuits 110 and analog input circuits 112 feed respective inputs of a multiplexer circuit 116 which in the illustrated embodiment comprises a sixteen-to-one multiplexer. The input selected by the sixteen-to-one multiplexer 116 is fed on its output line to the input of the A to D convertor 102.

It will be noted that the two frequency input circuits 114, 114*a* feed respective inputs P2.3 and P2.4 of the microcomputer 100 in the illustrated embodiment. Additionally, one further analog input circuit 112*b*, 112*c* is associated with each of these frequency input circuits and preferably at the sensor input end thereof. These further analog input circuits are also coupled to the input side of the multiplexer 116. These additional analog input circuits are provided to detect possible fault conditions on the sensors coupled to the inputs of the frequency input circuits 114, for example, an open circuit or a short circuit condition at these inputs. Such a short circuit or open circuit condition at any analog input 112 will be apparent to the microcomputer 100 as a result of the coupling of these inputs thereto by way of multiplexer 116 and A to D convertor 102.

The microcomputer also utilizes the data bus and selected ports to feed the display 30 by way of suitable display driver components 120 and 122. In the illustrated embodiment the display 30 is a liquid crystal display (LCD) and hence the display drivers are LCD driver components of the types generally designated CD22105 (120) and MM5452 (122). The controls 31 are illustrated as a $2\times2$ keyboard array coupled to suitable port inputs of the microcomputer 100. In this regard, provision has been made for an additional control key or button to perform other functions. For example, one button may be added to select either the program or test function of the programmer/tester 90, to operate a self-test program of the circuits of FIG. 7, or as an English/metric units selection key for selecting the units in which values are to be displayed upon the display 30. In this latter regard, the microcomputer 100 is preferably provided with suitable internal programming, or alternatively such programming may be provided on the memory component 104 for converting inputs to suitable values of the associated functions or conditions in either English or metric units.

A suitable power supply is provided for the circuit of FIG. 7 as indicated generally at reference numeral 124. Preferably, the power supply 124 is coupled to the vehicle battery and/or ignition switch. The condition of the battery may also be monitored by way of an additional input line 128 to the multiplexer 116. A suitable power-up and reset circuit for the microcomputer and in particular for preserving the condition of the memory 104 upon power up is indicated generally by reference numeral 126. A suitable audible alarm 130 may also be provided and is driven by way of a suitable drive transistor 132. The transistor 132 is in turn driven from an output P2.5 of the microcomputer 100.

In operation, the selected sensors may be coupled to selected ones of the input circuits 110, 112 and 114. The microcomputer 100 identifies sensors coupled thereto by reading the three-bit code provided by the code pins 72*a* of the embodiment of FIG. 3 or alternatively by reading the code provided by the switches 80 of the embodiment of FIGS. 4 and 5. Alternatively, the programmer/tester may be provided with similar code pins to initially give this indication to the processor, and thereafter the selected sensors may be coupled to appropriate ones of the inputs 110, 112 and 114.

Responsive to the encoded sensor identifying signals provided by one of the foregoing methods, the microcomputer 100 selects appropriate data and instructions for cooperating with those sensors from data and instructions stored in the memory 104. In this regard, preferably the memory 104 stores suitable data instructions for operating the microcomputer 100 in conjunction with any of a broad variety of different sensors for monitoring a broad variety of different functions and conditions of the vehicle. Accordingly, once specific sensors have been coupled to selected ones of the input circuits 110, 112 and 114 and the corresponding sensor identifying code signals have been coupled to appropriate ones of the switch input circuits 110, the microcomputer selects the appropriate portions of the program for cooperation with these sensors. Functionally, the microcomputer 100 receives the data by way of the multiplexer 116 and A to D convertor 102 and also receives data directly from the frequency input circuits 114 as previously described. In accordance with the selected data and instructions, the microcomputer is responsive to the sensor signals received for calculating the values of associated functions or the status of associated conditions, as the case may be, with respect to each sensor. The microcomputer then feeds suitable display signals representing the respective calculated values and ascertained statuses to the respective LCD drivers 120 and 122 for driving the display 24 to give suitable indications of each function or condition.

Without limiting the invention in any way, but for purposes of illustrating a specific example, the following table refers to the monitoring system illustrated in FIG. 1. In this regard, each monitoring module 16 is capable of receiving two analog sensor inputs and two frequency sensor inputs in addition to one or more switching inputs, as illustrated and described above with reference to FIG. 7. Other arrangements or assignments of inputs may of course be utilized without departing from the invention.

| MODULE 16a | MODULE 16b |
|---|---|
| *Battery (A) B.G. | *Fuel (A) B.G. |
| *Oil Press. (A) B.G. | *Cool. Temp (A) B.G. |
| *EGT (A) D | GND SPD (F) D |
| *540 PTO D | ENG RPM (F) D |
| *1000 PTO D (PTO Derived from Engine RPM (F) Input) | ENG HRS D (Eng. Hrs. Accumulate if RPM is greater than 500) |

-continued

| MODULE 16c | MODULE 16d |
|---|---|
| Hrs. to empty (fuel) B.G. (Long term Forecast) | Area/Hr. B.G. (5 Sec. Forecast) |
| Fuel/Hr. B.G. (Relative) | Wheel Slip B.G. (1 Sec.) |
| Service Time Elapsed D | Area D |
| Clock D | Implement Width D |
| Timer D | "Zero" Slip |
| (Requires accurate Fuel tank Sensor (A) Fuel Flow Sensor (F) and Eng. RPM (F) Sensor) | (Requires True GND SPD input (F), Axle GND SPD (F), IMPL Status Sw. (A).) |

A = Analog Sensor
D = 4-Digit Display
F = Frequency Sensor
* = Ext. Alarm, or Flashing Display Alert
BG = Bar Graph While the invention has been illustrated and described herein with reference to preferred embodiments, the invention is not limited thereto. Those skilled in the art may devise various alternatives, changes and modifications upon reading the foregoing descriptions. The invention includes such alternatives, changes and modifications insofar as they fall within the spirit and scope of the appended claims.

The invention is claimd as follows:

1. A monitoring system for monitoring a plurality of functions and conditions of a vehicle, said vehicle including a plurality of sensors for producing sensor signals in response to said plurality of functions and conditions, said monitoring system comprising: a plurality of identical monitoring modules, each comprising a plurality of input means each for receiving a selected one of said sensor signals, said plurality of input means being fewer in number than said plurality of sensors, processing means responsive to said sensor signals at said input means for producing display signals corresponding to the associated functions and conditions in accordance with said sensor signals, and memory means for storing data and instructions for enabling said processing means to respond to the sensor signals from any of said sensor means for monitoring any of said corresponding functions and conditions; and sensor identifying means associated with each of said modules for producing sensor identifying signals to identify the particular sensors coupled to said input means; said processing means being coupled to receive said sensor identifying signals from the associated sensor identifying means and responsive thereto for selecting from said memory means only those data and instructions for monitoring said corresponding functions and conditions, whereby said plurality of said monitoring modules are capable of monitoring all of said plurality of vehicle functions and conditions.

2. A monitoring system according to claim 1 wherein each said monitoring module further includes display means responsive to said display signals for producing observable indications of the values of the functions being monitored.

3. A monitoring system according to claim 1 each module further including means responsive to encoded signals corresponding to modification data for modifying the contents of said memory means to correspond to data and instructions for enabling said processing means to respond to sensor signals from additional sensors.

4. A monitoring system according to claim 1 wherein said sensor identifying means includes encoding means for producing encoded signals corresponding to the identities of said sensors, wherein said monitoring module further includes additional, code input means coupled to said processing means for receiving said encoded signals corresponding to the identities of said sensors and wherein said processing means is responsive to said encoded signals for selecting from said memory means data and instructions corresponding to the sensors identified by said encoded input signals.

5. A monitoring system according to claim 4 wherein said encoding means includes connector means for coupling said sensors to said monitoring module and for producing said encoded signals, and wherein said monitoring module further includes mating connector means coupled to said input means and to said additional input means.

6. A monitoring system according to claim 4 wherein said encoding means includes switching array means mounted on each module and coupled to said additional, code input means thereof.

7. A monitoring system according to claim 4 wherein said encoding means comprises programmer means independent of said modules for producing said encoded signals and connector means for coupling said programmer means to said additional, code input means of each module.

8. A monitoring system according to claim 3 and further including programmer means comprising said sensor identifying means, said programmer means producing encoded signals corresponding to the identities of said sensors and said encoded signals corresponding to modification data, and wherein said monitoring module further includes additional input means for receiving said encoded intput signals corresponding to sensor identities and to modification data, and wherein said processing means is responsive to said encoded signals for respectively selecting and modifying data and instructions from said memory means in accordance with the sensor identities and modification data corresponding to said encoded signals.

9. A monitoring system according to claim 1 wherein said input means comprises analog input means for receiving signals from selected ones of said sensors which produce analog signals corresponding to the value of the monitored function or condition and frequency input means for receiving signals from selected ones of said sensors which produce signals which vary in frequency in accordance with the value of monitored function or condition.

10. A monitoring system according to claim 9 each said monitoring module further including analog to digital converting means coupled in circuit between said analog input means and said processing means.

11. A monitoring system according to claim 10, each monitoring module further including multiplexing means coupled in circuit between said analog input means and said analog to digital converting means.

12. A monitoring system according to claim 2 wherein each said display means comprises a plurality of visual display elements responsive to said display signals for producing a plurality of visual displays corresponding to said plurality of functions and conditions; and further including a plurality of selectable label means capable of being respectively superimposed upon said visual display means of each module for labeling the display elements thereof in accordance with the functions and conditions corresponding to the particular sensors coupled to said input means of that module.

13. A monitoring system according to claim 12 wherein each said display means further includes display selecting means accessible to an operator for selecting at least two of said functions and conditions for alternative display on each of selected ones of said plurality of visual display elements.

14. A monitoring system according to claim 13 wherein each said label means further includes indicia capable of being superimposed upon said operator accessible selecting means for indicating the respective conditions and functions to be selected thereby.

15. A monitoring system according to claim 1 wherein said memory means comprises alterable, nonvolatile memory means operatively coupled with said processing means.

16. A monitoring module for monitoring a plurality of functions and conditions of a vehicle, said vehicle including a plurality of sensors for producing sensor signals in response to said plurality of functions and conditions, said monitoring module comprising: a plurality of input means each for receiving a selected one of said sensor signals, said plurality of input means being fewer in number than said plurality of sensors; processing means responsive to said sensor signals at said input means for producing display signals corresponding to the associated functions and conditions in accordance with said sensor signals; memory means for storing data and instructions for enabling said processing means to respond to the sensor signals from any of said sensor means for monitoring any of said corresponding functions and conditions; sensor identifying means for delivering sensor identifying signals to said processing means to identify the particular sensors coupled to said input means; said processing means being responsive to said sensor identifying signals for selecting from said memory means only those data and instructions for monitoring said corresponding functions and conditions; and additional, code input means on said module coupled to said processing means for receiving encoded signals corresponding to the identities of said sensors and comprising said sensor identifying signals.

17. A monitoring module according to claim 16 and further comprising connector means for coupling said input means to said sensors and coupled to said additional input means for receiving said encoded signals.

18. A monitoring module according to claim 16 wherein said sensor identifying means further includes switching array means on said module coupled to said additional input means for producing said encoded signals.

19. A monitoring module according to claim 16 wherein said processing means further includes means responsive to externally generated control signals for modifying the contents of said memory means to correspond to data and instructions for enabling said processing means to respond to sensor signals from additional sensors.

20. A monitoring module according to claim 16 and further including a plurality of visual display elements responsive to said display signals for producing a plurality of visual displays corresponding said plurality of functions and conditions and selectable label means capable of being superimposed upon said visual display elements for labeling the display elements in accordance with the function and conditions corresponding to said input means.

21. A monitoring module according to claim 20 wherein said display means further includes selecting means accessible to an operator for selecting at least two of said functions and conditions for alternative display on each of selected ones of said plurality of visual display elements.

22. A monitoring module according to claim 21 wherein each said label means further includes indicia capable of being superimposed upon said selecting means for indicating the respective functions and conditions to be selected thereby.

23. A method for monitoring a plurality of functions and conditions of a vehicle, said vehicle including a plurality of sensors for producing sensor signals in response to said plurality of functions and conditions, said monitoring method comprising: providing a plurality of identical monitoring modules, each comprising a plurality of input means each for receiving a selected one of said sensor signals, said plurality of input means being fewer in number than said plurality of sensors, each module further comprising processing means responsive to said sensor signals at said input means for producing display signals corresponding to the associated functions and conditions in accordance with said sensor signals, display means responsive to the display signals for producing observable indications of the corresponding functions and conditions, and memory means for storing data and instructions for enabling said processing means to respond to the sensor signals from any of said sensor means for monitoring any of said corresponding functions and conditions; coupling selected ones of said sensor means to each of said input means; providing sensor identifying means associated with each of said modules for producing sensor identifying signals to identify the particular sensors coupled to said input means; coupling the processing means of each module to receive said sensor identifying signals from the associated sensor identifying means for selecting from said memory means only those data and instructions for monitoring said corresponding functions and conditions, whereby said plurality of monitoring modules are capable of monitoring all of said plurality of vehicle functions and conditions.

24. A monitoring method according to claim 23 wherein each said module also includes a plurality of visual display elements responsive to said display signals for producing a plurality of visual displays corresponding to said plurality of functions and conditions; and further include superimposing one of a plurality of selectable labels upon said visual display elements of each module, each said label being selected for labeling the display elements of the module upon which it is superimposed in accordance with the functions and conditions corresponding to the particular sensors coupled to said input means of that module.

* * * * *